United States Patent [19]
Presciuttini

[11] 4,397,811
[45] Aug. 9, 1983

[54] NUCLEAR REACTOR WITH INTEGRAL HEAT EXCHANGERS

[75] Inventor: Leonardo Presciuttini, Sceaux, France

[73] Assignee: Novatome, Le Plessis Robinson, France

[21] Appl. No.: 291,678

[22] Filed: Aug. 10, 1981

[30] Foreign Application Priority Data

Sep. 19, 1980 [FR] France .................................. 80 20180

[51] Int. Cl.³ .............................................. G21C 15/00
[52] U.S. Cl. ..................................... 376/405; 376/260; 376/460
[58] Field of Search ...................... 376/402–405, 376/461, 460, 260, 206, 290, 261–263, 360, 359, 298

[56] References Cited

U.S. PATENT DOCUMENTS

4,342,721  8/1982  Pomie et al. ..................... 376/298

FOREIGN PATENT DOCUMENTS

A089891  7/1967  France ............................. 376/461
2099666  3/1972  France ............................. 376/404

*Primary Examiner*—Harvey E. Behrend
*Attorney, Agent, or Firm*—Pollock, Vande Sande & Priddy

[57] ABSTRACT

A nuclear reactor having integral heat exchangers comprises intermediate heat exchangers (35) which are entirely contained within the reactor vessel (1) and bear on the support (4) for the reactor core (5) at the periphery of the latter. Each one of the intermediate heat exchangers (35) is connected to the secondary liquid sodium circuit by a conduit (50) which passes through a slab (8) closing off the top of the reactor. An upper rotating stopper (15) includes an opening (53) of a size which is comparable to that of the cross-section of an intermediate heat exchanger (35), the opening being located at such a distance from the axis of rotation (12) of the stopper that the opening (53) can be brought into vertical alignment with each one of the intermediate heat exchangers (35) in succession. The invention particularly relates to fast neutron reactors which are cooled with liquid sodium.

4 Claims, 3 Drawing Figures

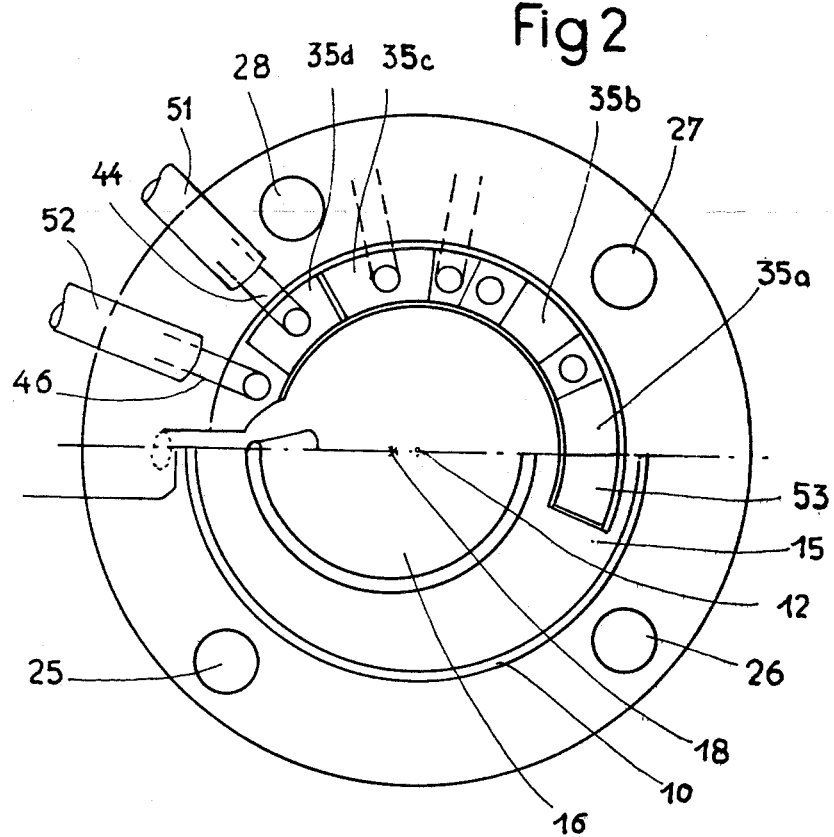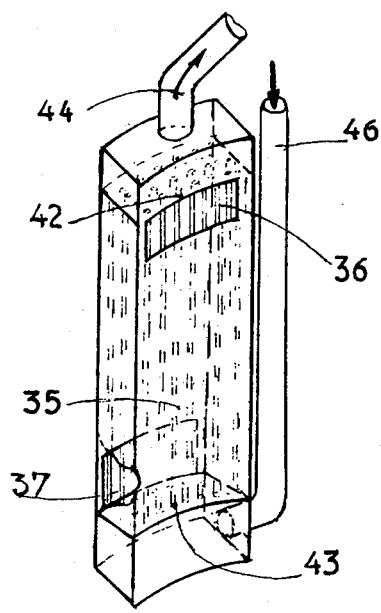

NUCLEAR REACTOR WITH INTEGRAL HEAT EXCHANGERS

FIELD OF THE INVENTION

The invention relates to a nuclear reactor having integral heat exchangers and cooled using liquid sodium.

BACKGROUND

Fast neutron nuclear reactors which are cooled with liquid sodium comprise a core consisting of the fuel assemblies carried on a horizontal support which is arranged inside a vessel containing liquid sodium, which constitutes the primary fluid of the reactor, into which the whole set of fuel assemblies is inserted. The liquid sodium which comes into contact with these assemblies, i.e., the primary sodium, is not used directly for transmitting the heat from the reactor core to the steam generator, which produces the steam for supplying the turbine.

The primary sodium which circulates inside the vessel, and is caused to do so by pumps, provides for heating of the secondary liquid sodium inside intermediate heat exchangers.

The pumps used for circulating the primary sodium and the intermediate heat exchangers are arranged inside the reactor vessel, and are consequently inserted, in the same way as is the core of the reactor, into the primary sodium which fills the vessel.

The secondary liquid sodium circulates in a closed circuit between the intermediate heat exchangers and the steam generators where the heat which is carried by this secondary liquid sodium provides for vaporization of the feed water and the production of the steam which is used by the turbine.

The reactor vessel is closed at its upper end by a horizontal slab of great thickness which has openings formed in it allowing the passage of the components of the reactor and the measuring devices associated with the latter which are generally of elongated shape and are arranged vertically. The lower parts of these components or measuring devices pass inside the vessel through openings which are provided in the slab, while the upper parts of such components or measuring devices rest on the slab outside the vessel, which assures that such components or measuring devices are maintained in position. A sealing device which is provided between the component and the slab allows the component to close off the openings in the slab in a sealed manner. In particular, the primary pumps and the intermediate heat exchangers have such arrangements provided at the openings in the slab.

On the other hand, a large dimensional opening is provided at the central part of the slab vertically above the reactors core. This opening is designed to receive a unit which allows the reactor to be controlled by displacing rods which absorb neutrons in the core, and a device for handling the fuel assemblies so as to carry out the loading and unloading stages of the reactor core.

The control unit and the handling device are carried on a horizontal platform which can be rotated about a vertical axis referred to as the "large rotating stopper", and which closes off the opening provided in the slab.

The control unit and the device for handling the fuel assemblies are mounted on a circular platform which is referred to as the "small rotating stopper", and the dimensions of this are smaller than those of the large rotating stopper, it being rotatably mounted on the large rotating stopper about a vertical axis which is different from the axis of rotation of the latter.

The large rotating stopper has a diameter which is greater than the diameter of a cylinder arranged on a vertical axis which is of such a size that it would contain the whole of the core.

The components, which must remain in a fixed position when movement of the large rotating stopper arranged at the central portion of the slab occurs, consequently must be arranged on the slab in the region of the latter which is located at the periphery of the large rotating stopper.

This, for example, applies to the primary pumps and the intermediate heat exchangers which must be arranged all around the large rotating stopper and in abutment with the peripheral region of the slab.

This arrangement of the intermediate heat exchangers, which are eight in number in the case of fast neutron nuclear reactors of a power of 1200 MW which are at present being built, makes it necessry to provide a slab and a vessel of a large diameter in order to be able to arrange components which are of appreciable weight on the slab at the peripheral region of the latter.

The vessel of the nuclear reactor is consequently of appreciably larger diameter than the diameter of the core, generally of the order of three times the diameter of the core.

The vessel which holds the liquid sodium in which the reactor core and the main components of the reactor are immersed is, furthermore, surrounded by a safety vessel which further increases the space occupied by the complete vessel assembly. In order to reduce constructional costs of the nuclear reactor, and in order to be able to reduce the amount of primary liquid sodium which fills this vessel, it is desirable to be able to reduce the diameter of the vessel.

SUMMARY OF THE INVENTION

The object of the invention is consequently to provide a nuclear reactor with integral heat exchangers comprising, in a vessel which holds the liquid sodium constituting the primary fluid in which the reactor core is immersed, said core being constituted by fuel assemblies resting on a horizontal support which bears on the lower part of the vessel, at least two intermediate heat exchangers which provide for heating of the secondary liquid sodium by the liquid sodium contained in the vessel, i.e., the primary sodium, said heat exchangers being generally of a cylindrical and elongated shape and being each connected to a circuit for carrying the secondary sodium between the intermediate heat exchanger and a vapor generator for producing water vapor using the heat which has been carried by the secondary sodium, the reactor vessel being closed by a horizontal slab in which openings are provided, one of which, of large dimensions and arranged above the core, is equipped with a platform which is rotatably mounted about a vertical axis, referred to as the large rotating stopper, carrying the control unit for the nuclear reactor and a device for handling the fuel assemblies, the intermediate heat exchangers which are completely contained within the vessel being connected to the secondary sodium circuit by conduits which pass through the slab closing the reactor, this nuclear reactor being designed to include a vessel of reduced dimensions, which at the same time allows easy access to the intermediate heat exchangers from the slab covering the reactor in order to carry out maintenance or disassembly of the same.

In order to achieve the stated object, the reactor is characterised in that the intermediate heat exchangers which are arranged vertically rest, at their lower ends, on the support for the core, at the periphery of the latter, and in that the large rotating stopper includes an opening of a size which is comparable to the dimension of the cross section of the intermediate heat exchanges located at a distance from the axis of rotation of the rotating stopper, which makes it possible to bring this opening into vertical alignment which each one of the heat exchangers in sequence, by rotating the stopper.

In order that the invention may be more clearly understood, a description now follows, which is provided by way of non-limiting example and with reference to the attached drawings of one embodiment of a nuclear reactor according to the invention, this reactor being a fast neutron reactor having a power of 1200 MW including 8 integral intermediate heat exchangers.

BRIEF DESCRIPTION OF THE DRAWINGS

FIG. 2 is a plan view of the vessel shown in FIG. 1, the lower part of FIG. 2 being a partial view of the bottom of the vessel and the other part of FIG. 2 being a partial view in section, of the vessel at line A—A in FIG. 1.

FIG. 3 is a perspective view of an intermediate heat exchanger arranged inside the vessel of the nuclear reactor.

DETAILED DESCRIPTION

Figure 1:
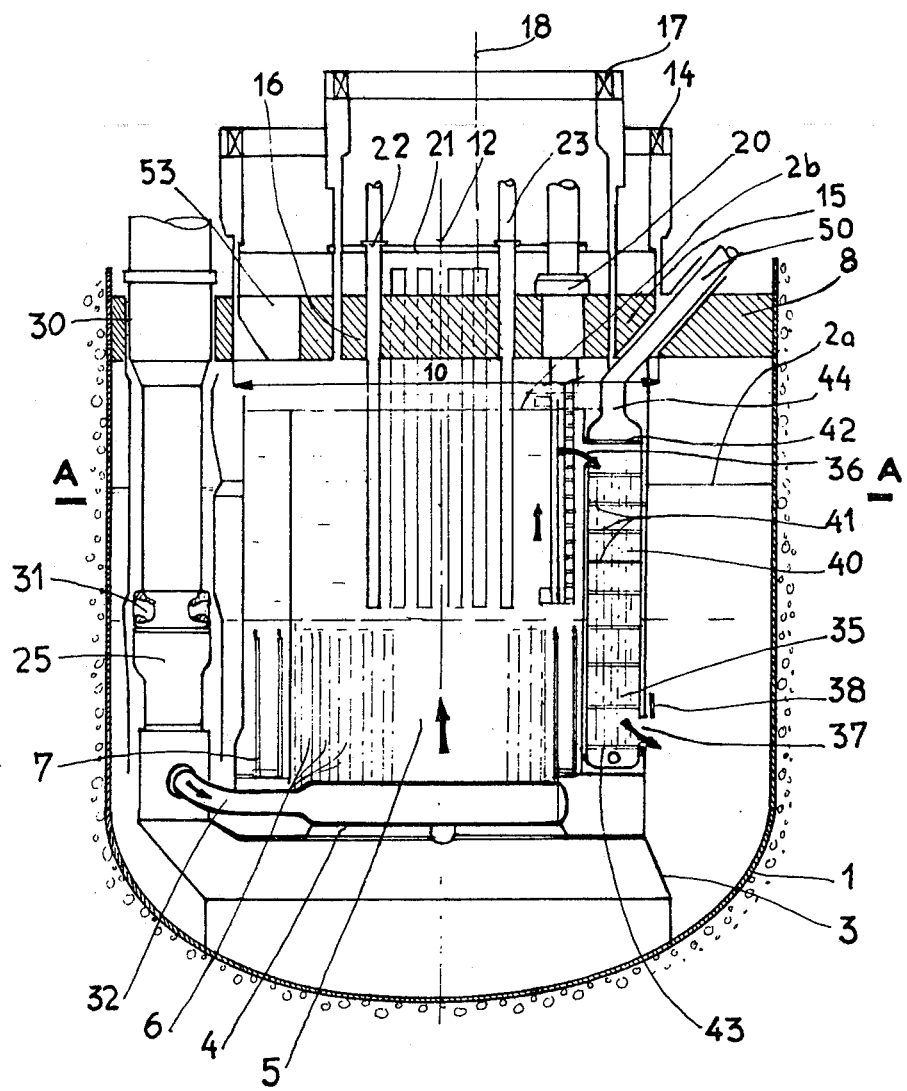
FIG. 1 is a vertical cross-section of the nuclear reactor vessel.

With reference to FIG. 1, this shows the main vessel 1 of the reactor filled with liquid sodium up to a level 2a at the peripheral part and 2b at the central part, inside the cylinder constituting the internal vessel.

A structure 3 rests on the lower part of the vessel and carries a bearer 4 constituting the support for the reactor core. The reactor core is made up by fuel assemblies 6 and is surrounded by vertical bars 7 which constitute the lateral neutron protection arrangement of the reactor, the whole assembly being carried by the bearer 4.

At its top end, the vessel 1 is closed off by a slab 8 of great thickness which includes, at its central part, an opening 10 of large diameter.

A platform 15 constituting the large rotating stopper is mounted inside the opening 10 and is arranged to be rotatable about a vertical axis 12 by making use of a horizontal annular bearing arrangement 14.

The large rotating stopper has a circular cross-section as shown at the bottom part of FIG. 2, and has a frusto-conical shape arranged on an axis 12.

The large rotating stopper 15 has a small rotating stopper 16 mounted on it. This is cylindrical and has a circular cross-section and is rotatably displaceable about an axis 18 on the large rotating stopper 15, making use of a horizontal annular bearing arrangement 17.

The small rotating stopper 16 carries a device for handling the fuel assemblies 20 and the covering stopper 21 of the reactor core which carries the mechanisms such as 22 and 23 which allow the control rods of the reactor to be replaced.

The rotational movements of the large rotating stopper 15 and the small rotating stopper 16 about the axes 12 and 18, respectively, make it possible to locate the handling device 20 at every position allowing for handling of a particular fuel assembly which is provided inside the core. The annular peripheral portions of the slab 8 arranged around the central circular opening 10 carry, as was the case in the prior art, the primary pumps such as 25, shown in FIG. 1.

Four primary pumps 25, 26, 27 and 28, the positions of which can be seen in FIG. 2, are consequently arranged at the periphery of the slab 8 in such a way that their upper parts which bear against the slab 8 project with respect to the latter, and their lower parts penetrate into holes such as 30, provided in the slab, when passing inside the vessel 1 filled with the liquid sodium.

The assembly and operation of the primary pump 25 will now be described with reference to FIG. 1, the remaining pumps 26, 27 and 28 being arranged in an identical manner to that of pump 25.

A conduit 32 is connected to the upper part of the pump, and the liquid sodium which enters into the pump body through opening 31 is pumped into this. The conduit 32 discharges inside the bearer structure 4 which supports the reactor core 5.

The liquid sodium constituting the primary fluid and which takes up the heat energy released by the core 5 of the reactor is consequently caused to circulate in this manner. The liquid sodium which is pumped via the pump 25 to the base of the core 5 of the reactor comes into contact with the fuel assemblies 6, passes vertically in the upward direction, through the core 5, and becomes increasingly heated. The hot primary liquid sodium leaving the upper end of the core then passes into the intermediate heat exchangers for heating up the secondary liquid sodium.

In FIG. 1 an intermediate heat exchanger 35 can be seen, the body of which is made up by a portion of a cylinder the cross-section of which can be seen in FIG. 2. This heat exchanger 35 is also shown in perspective view in FIG. 3. It consists of an outer casing having two cylindrical faces on the same axis and two plane faces which pass through this axis. Within the complete reactor eight intermediate heat exchangers are provided, four of these, 35a, 35b, 35c and 35d, having been shown at the upper half of FIG. 2.

The intermediate heat exchangers, such as the heat exchanger 35, have their lower parts supported by the bearer 4 which carries the core, and are arranged at the periphery of the reactor core in a space in the shape of a portion of a cylinder surrounding the reactor core and the control unit carried by the closing cover of the core 21. The cross-section of these intermediate heat exchangers, which is in the shape of a portion of a crown, consequently corresponds perfectly to the most effective filling of this space in the shape of a portion of a cylinder. Each heat exchanger includes two cylindrical surfaces on the same axis 12, one of which is directed towards the reactor core and the other of which is directed towards the internal wall of the vessel 1, and two plane surfaces which pass through the axis 12.

Thus, as can be seen in FIGS. 1 and 3, the heat exchanger 35 carries at its upper part an opening 36, which is directed towards the core of the reactor allowing primary liquid sodium, which has been heated, and originating from the core, to enter it.

The heat exchanger 35 also includes an opening 37 at its lower part, and this is directed towards the internal wall of the vessel to allow the primary liquid sodium to pass out from it. The circulation of the primary liquid sodium in the reactor has been shown by arrows in FIG. 1.

The opening 37 may be closed by a shutter 38.

The inside of the body of the heat exchanger 35 carries a tubular bundle 40 the small diameter tubes of which are kept in position by intermediate plates 41, and the tubes which constitute the bundle are fixed to end plates 42 and 43.

Above the end plate 42, the body of the heat exchanger is extended by a conduit 44 which communicates with the region of the body of the heat exchanger at which the set of tubes of small diameter constituting the bundle 40 terminate. A vertical conduit 46 is, in the same way, connected to the lower end of the body of the heat exchanger below the end plate 43, in other words, at the region where the set of tubes constituting the bundle terminate.

The conduits 44 and 46 are connected to the secondary liquid sodium circuit which has the purpose of heating up and vaporizing the feed water inside the steam generator.

The secondary liquid sodium, when it circulates in the tubes of the bundle 40, is heated up by the primary liquid sodium which flows so as to be in contact with the outer walls of the bundle of tubes 40.

The conduit 44 is connected to a pipe 50 which passes through the slab closing the reactor at its peripheral region and externally of the opening 10 inside which the large rotating stopper 15 is arranged.

In the same way, the part 46 passes through the slab 8 at its peripheral region. The intermediate heat exchangers such as 35 are consequently arranged entirely within the vessel 1, below the level of the liquid sodium 2, the conduits for circulating the liquid sodium passing through the slab 8.

Externally of the vessel, the conduits for carrying the secondary liquid sodium, 44 and 46 pass into lagged, large diameter conduits 51 and 52.

Moreover, the large rotating stopper 15 has a passage 53 passing right through it, and this opening 53, as can be seen in FIG. 2, has the shape of the cross-section of the intermediate heat exchangers and a dimension which is slightly greater than the dimension of this cross-section.

The opening 53 is moreover located at a distance from the axis 12 of the large rotating stopper, which makes it possible to locate this opening 53 above each one of the intermediate heat exchangers 35a, 35b, 35c, and 35d in succession, in order to be able to gain access to these heat exchangers.

With the aid of the opening 53, after the conduits such as 50 which link the channels 44-46 to the secondary sodium circuit have been disassembled, it is possible to remove the heat exchanger from the reactor vessel by introducing a lifting means through the opening 53.

A closing plate or a canopy can then be fitted above the opening 53, when the latter is not in service, to provide for closing of the vessel.

One of the main advantages of the invention is that it makes it possible to reduce the diameter of the vessel, since the peripheral part of the slab externally of the large rotating stopper now only carries the primary pumps as components of appreciable weight and it is now possible to reduce the size of the slab. In fact, when the intermediate heat exchangers, which for example are eight in number in the case of a nuclear reactor having a power of 1200 MW, are arranged on the periphery of the vessel between the primary pumps, it is necessary to assure adequate spacing of the various components of appreciable weight for reasons of the mechanical strength of the slab and for reasons of the space which is taken up by these inside the vessel.

Provision of the body of the heat exchangers in the shape of portions of a cylinder makes it possible to limit the diameter of the vessel to an even greater extent than if one were to use intermediate heat exchangers of a cylindrical shape with a circular cross-section arranged around the core and on the support for the latter.

A reduction of several meters in the diameter of the vessel is possible in the case of a vessel which is ordinarily of a diameter close to 20 m.

A reduction of this order in the size of the vessel makes it possible to achieve economies when manufacturing the vessel, the slab and the building which houses the reactor.

Moreover, this reduction in dimensions also makes it possible to decrease the amount of primary liquid sodium which is necessary in the reactor vessel.

The invention is, however, not to be considered as being limited to the embodiment which has just been described, but rather includes all variations in the same. Although intermediate heat exchangers have been described which have cross-sections shaped as portions of a cylinder, making it possible to achieve a high degree of compactness in the arrangment of the components inside the vessel, it is equally possible to make use of intermediate heat exchangers which are more conventional in their design and have a cylindrical shape or circular cross-section.

It will also be seen that the arrangement of the intermediate heat exchangers at the periphery of the reactor core on the support for the latter makes it possible to provide circulation of the primary liquid sodium which is particularly simple and rational through each one of the heat exchangers. One thus achieves a considerable simplification in the design and operation of the intermediate heat exchanger with respect to heat exchangers following the prior art. But it is equally possible to use more conventional heat exchangers in which the circulation of liquid sodium inside the heat exchanger takes place between the two openings which communicate with the internal space of the vessel, arranged at the side of the heat exchanger which is directed towards the core.

The operation of such a device is nevertheless less satisfactory since the heating up of the secondary liquid sodium varies depending on the position of the tubes within the bundle of the intermediate heat exchanger.

The conduits which connect the intermediate heat exchangers to the secondary sodium circuit may be fixed on these heat exchangers at the position of their inlet or outlet pipe for the secondary liquid sodium, using welding or a releasable mechanical coupling, such as a coupling which employs screwed components.

The invention moreover applies to every nuclear reactor which is cooled with liquid sodium including intermediate heat exchangers which are arranged within the reactor vessel, however many exchangers are used and independently of the number of pumps used for circulating the primary fluid inside the vessel.

I claim:

1. Nuclear reactor having integral heat exchangers comprising, in a vessel (1) containing liquid sodium, constituting the primary circuit in which the core (5) of said reactor is immersed, said core comprising fuel assemblies (6), supported by a horizontal support (3-4)

bearing on the lower part of said vessel (1), at least two intermediate heat exchangers (35) which enable heating of secondary liquid sodium using the liquid sodium contained in said vessel (1) or primary liquid sodium, said heat exchangers being generally of an elongated shape and being each connected to a circuit for transporting said secondary liquid sodium between said intermediate heat exchanger and a vapor generator for producing water vapor by employing the heat transported by said secondary liquid sodium, the vessel (1) of said reactor being closed by means of a horizontal slab (8) having openings one (10) of which, of large diameter and arranged above the core (5), is equipped with a platform (15) which is mounted so as to be rotatable about a vertical axis, referred to as the large rotating stopper, carrying the unit for control of said reactor and a device for handling the fuel assemblies, said intermediate heat exchangers (35) which are entirely enclosed within the vessel (1) being connected to said secondary sodium circuit by conduits (50) which pass through the slab closing of the reactor, said intermediate heat exchangers (35) which are arranged vertically, having their lower parts bearing on a support (3) of the core (5) at the periphery of the latter, said large rotating stopper (15) having an opening (53) of a size which is comparable to the dimensions of the cross-section of said intermediate heat exchangers (35), located at a distance from the axis of rotation of said rotating stopper, which makes it possible to bring this opening sequentially into vertical alignment with each one of the heat exchangers (35), by rotating said stopper (15).

2. Nuclear reactor with integral heat exchangers according to claim 1, wherein the body of said intermediate heat exchangers (35) is in the shape of a portion of a cylinder limited by two cylindrical surfaces having a common vertical axis and by two planes which pass through this axis.

3. Nuclear reactor with integral heat exchangers according to claim 2, wherein said intermediate heat exchangers (35) include an opening (36) for the entry of primary liquid sodium into the heat exchanger, said opening passing through one of the cylindrical walls of said exchanger (35) directed towards the core (5) of the reactor in its upper part, and an opening (37) for the outlet of primary liquid sodium which passes through the other cylindrical wall of said heat exchanger (35), and which is directed toward the internal wall of the vessel (1) at the lower part of said heat exchanger (35).

4. Nuclear reactor with integral heat exchangers according to any one of claims 1 to 3, wherein said conduits (50) are attached to said heat exchangers by a remotely releasable mechanical or welded coupling.

* * * * *